(12) United States Patent
Joo

(10) Patent No.: US 7,555,120 B2
(45) Date of Patent: Jun. 30, 2009

(54) SLIDE TYPE MOBILE TERMINAL

(75) Inventor: Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 11/397,496

(22) Filed: Apr. 3, 2006

(65) Prior Publication Data

US 2007/0123318 A1 May 31, 2007

(30) Foreign Application Priority Data

Apr. 4, 2005 (KR) ...................... 10-2005-0028228

(51) Int. Cl.
*H04M 1/00* (2006.01)
*H04M 9/00* (2006.01)
(52) U.S. Cl. ........................... 379/433.12; 379/433.13; 455/575.4
(58) Field of Classification Search ............ 379/433.01, 379/433.11, 433.12, 433.13; 455/575.1, 455/575.3, 575.4; 16/327, 328
See application file for complete search history.

(56) References Cited

U.S. PATENT DOCUMENTS

| | | | |
|---|---|---|---|
| 7,155,266 B2 * | 12/2006 | Stefansen | 455/575.3 |
| 7,433,723 B2 * | 10/2008 | Bae | 455/575.4 |
| 2006/0109980 A1 * | 5/2006 | Miyazaki | 379/433.12 |

FOREIGN PATENT DOCUMENTS

| | | |
|---|---|---|
| DE | 20317865 U | 3/2004 |
| EP | 1631043 A | 3/2006 |
| JP | 2001292213 | 10/2001 |
| JP | 2003031968 | 1/2003 |
| JP | 2003298699 | 10/2003 |
| JP | 2005051421 | 2/2005 |
| JP | 2006102551 | 4/2006 |
| WO | WO03/050665 A | 6/2003 |

* cited by examiner

*Primary Examiner*—Tuan D Nguyen
(74) *Attorney, Agent, or Firm*—Lee, Hong, Degerman, Kang & Waimey

(57) ABSTRACT

A hand-held mobile terminal for use in a mobile communications network is provided. The terminal comprises a first body comprising a top portion and a bottom portion, the top of the first body comprising a user interface for allowing a user to interact with the mobile terminal to input data; a second body comprising a top portion and a bottom portion, the top portion of the second body comprising a display panel; and a slide mechanism disposed in a cavity, formed between the first body's top portion and the second body's bottom portion, for coupling the first and second bodies and for allowing the second body to slide relative to the first body in both longitudinal and latitudinal directions.

20 Claims, 10 Drawing Sheets

SLIDE TYPE MOBILE TERMINAL

CROSS REFERENCE TO RELATED APPLICATIONS

Pursuant to 35 U.S.C. § 119(a), this application claims the benefit of earlier filing date and right of priority to Korean Patent Application No. 2005-0028228, filed on Apr. 4, 2005, the content of which is hereby incorporated by reference herein in its entirety.

FIELD OF THE INVENTION

The present invention relates to a slide type mobile terminal and, more particularly, to a slide type mobile terminal that can be opened and closed when any side of a slide body is pushed.

BACKGROUND

A flip type mobile terminal is constructed such that a cover is rotatably mounted to open and close over a main body. The main body includes dial buttons and menu buttons and the cover includes a LCD. In order to better view graphical information, there are increasing demands for larger LCDs on mobile terminals. So a slide type mobile terminal is marketed that includes a first body allowing a user to input information and a second body having a large size LCD for displaying various image information. The second body may slidably open and close over the first body.

FIG. 1 is a perspective view of a slide type mobile terminal in accordance with a related art. The related art mobile terminal includes a first body 102 having a display panel 110 for displaying various information mounted thereon and a second body 104 on which the first body 102 is slidably mounted. A keypad 106 allows a user to input data is mounted on the front surface. A slide module is installed between the first body 102 and the second body 104. The first body 102 slides in a longitudinal direction over the second body 104.

The slide module includes guide grooves 126 formed in a longitudinal direction at both sides of the second body 104, and corresponding guide rails 128 are formed at both sides of the first body inserted into the guide grooves 126, such that the first body can move in the longitudinal direction relative to the second body 104.

When a user pushes a lower end of the first body 102 in the longitudinal direction over the second body 104, the guide rail 128 is moved along the guide groove 126 towards an open position. When the user finishes using the mobile terminal, he pushes down on an upper end of the first body 102 to close it.

The above slide type mobile terminal has a problem in that the lower end of the first body 102 must slide up to open the terminal. Such movement is not convenient for users. In addition, since the first body 102 is slidably moved only in the longitudinal direction over the second body 104, various operations cannot be performed.

Methods and systems are needed to overcome the above-mentioned short comings.

SUMMARY OF THE INVENTION

A hand-held mobile terminal for use in a mobile communications network is provided. The terminal comprises a first body comprising a top portion and a bottom portion, the top portion of the second body comprising a display panel; a second body comprising a top portion and a bottom portion, the top of the first body comprising a user interface for allowing a user to interact with the mobile terminal to input data; and a slide mechanism disposed in a cavity, formed between the second body's top portion and the first body's bottom portion, for coupling the first and second bodies and for allowing the first body to slide relative to the second body in both longitudinal and latitudinal directions.

In a closed position, the first body covers the top portion of the second body to prevent access to the user interface. In an open position, the first body slides relative to the top portion of the second body, by way of the slide mechanism in at least one of the longitudinal and latitudinal directions, to expose the user interface, and wherein in both the open and closed positions the longitudinal axis of the first body is parallel to the longitudinal axis of the second body.

The slide mechanism comprises a case, a first gear rotatably mounted on a first side of the case and coupled to the first body, a second gear rotatably mounted on the second side of the case and coupled to the second body, and a third gear engaged to the first and second gears to transfer rotational movement between the first gear and the second gear.

In a preferred embodiment, the slide mechanism is diagonally positioned, between the first body and the second body, in relationship to the longitudinal axes of the first body and the second body, wherein the diagonal positioning is defined by a first angle formed between imaginary first and second axes. The first axis passes through center of the first and second gears. The second axis passes through the center of the second and third gears. The first angle is approximately between 30~40 degrees in an exemplary embodiment.

In one embodiment, the case comprises a first bush on which the first gear is rotatably mounted; a second bush on which the second gear is rotatably mounted; and a third bush on which the third gear is rotatably mounted. The third bush is positioned between the first bush and the second bush. A first opening is defined in the first bush and a second opening is defined in the second bush.

In a certain embodiment, the mobile terminal further comprises a cable for electrically connecting the first body to the second body, wherein the cable passes through the first and second openings. A cable passage preferably connects the first and second openings, providing a thorough way for the cable to pass from the first side of the case to the second side of the case.

In one or more embodiments, the sliding module further comprises a cover for covering the first and second sides of the case to protect the cable and the sliding module further comprises a position maintaining unit for maintaining a slide position of the first body relative to the second body in multiple lock states. The position maintaining unit comprises a fixed ring in operational relationship with the first and second bushes, wherein a plurality of grooves are defined at an outer circumferential surface of the fixed ring.

In yet another embodiment, a ball for engaging at least one of said plurality of grooves may be provided so that each groove is associated with a lock position for maintaining the slide position of the first body relative to the second body. A biasing member may be also provided for applying pressure on the ball so that the ball engages a first groove from among said plurality of grooves, when the first body slides relative to the second body in a first lock position.

Additional advantages, objects and features of the invention will be set forth in part in the description that follows, and in part will become apparent to those having ordinary skill in the art upon examination of the following. They also may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
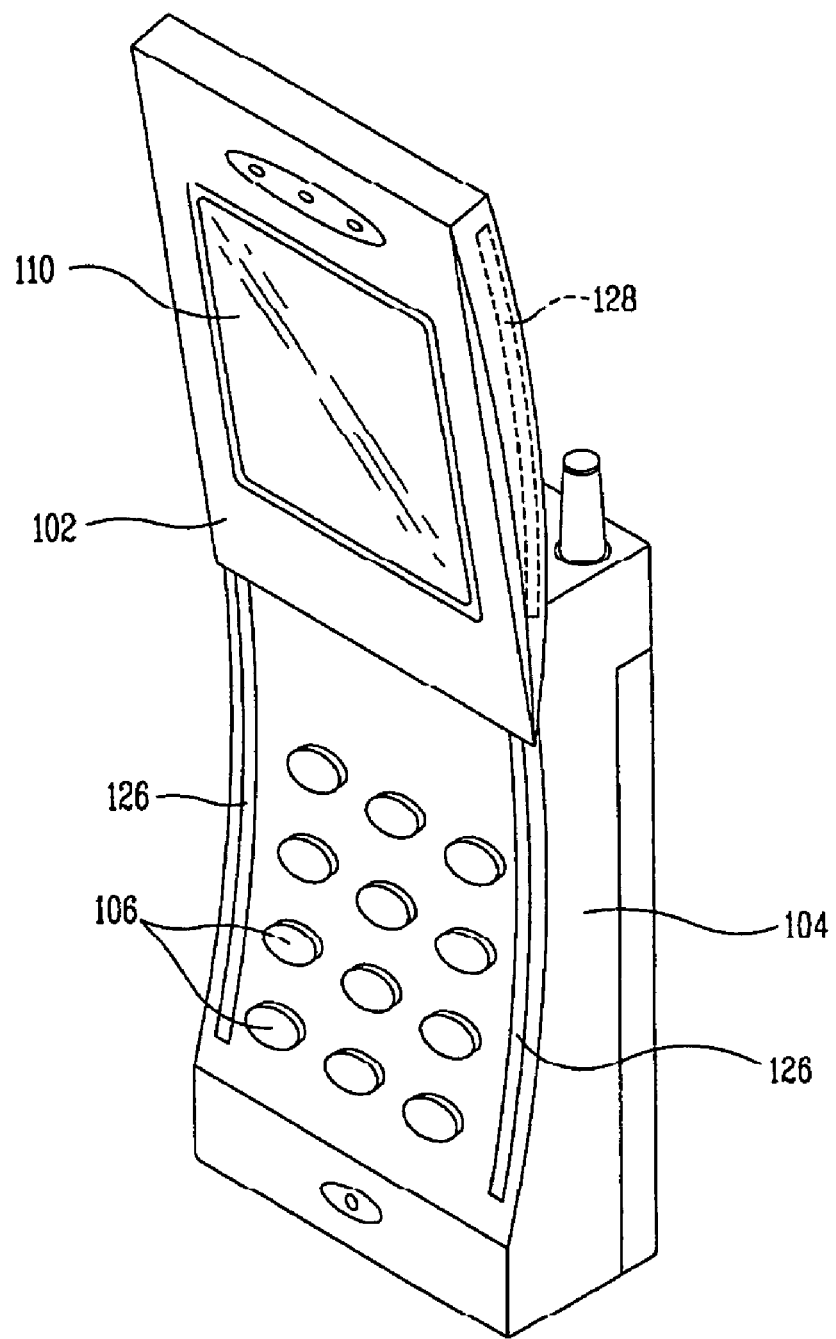
FIG. 1 is a perspective view of a slide type mobile terminal in accordance with the related art.
Figure 2:
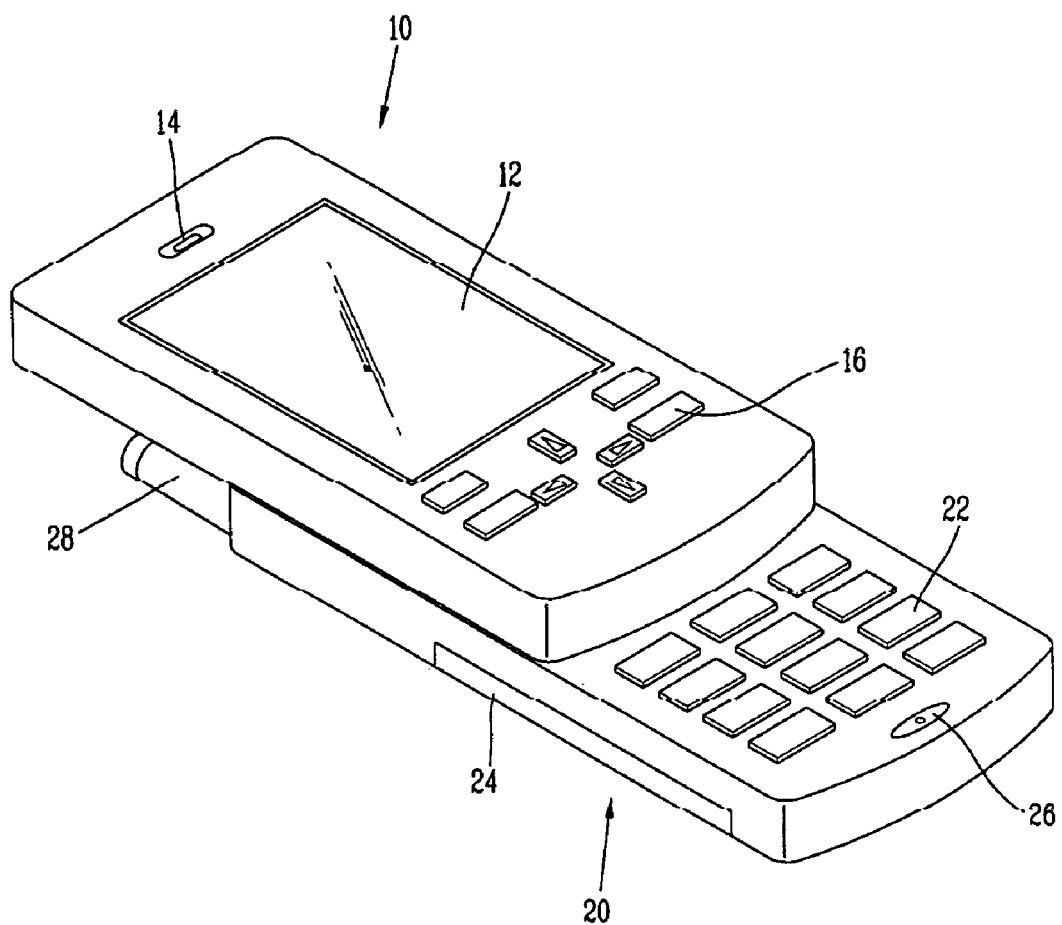
FIG. 2 is a perspective view of a slide type mobile terminal in accordance with one embodiment of the present invention.

Referring to FIG. 2, in a preferred embodiment, a slide type mobile terminal comprises a first body 10 having a display panel 12 and a speaker 14. The first body 10 is slidably mounted relative to a second body 20. The second body 20 has a key pad 22 and a battery 24. Various function keys 16 are installed on the front surface of the first body 10, and an antenna 28 and a microphone 26 are installed on the second body.

Figure 3:
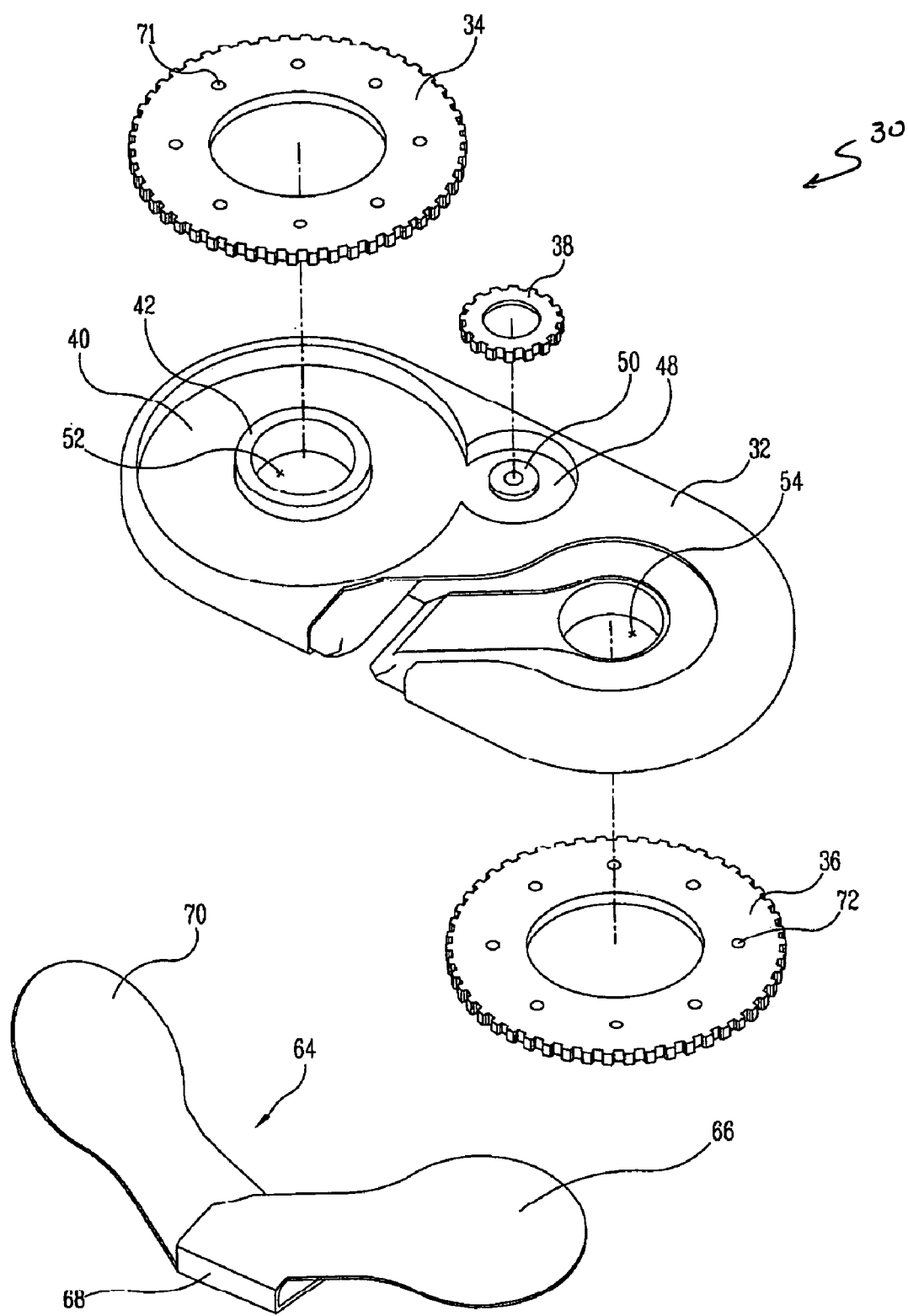
FIG. 3 is an exploded perspective view of a slide unit of the slide type mobile terminal in accordance with one embodiment of the present invention.
Figure 4:
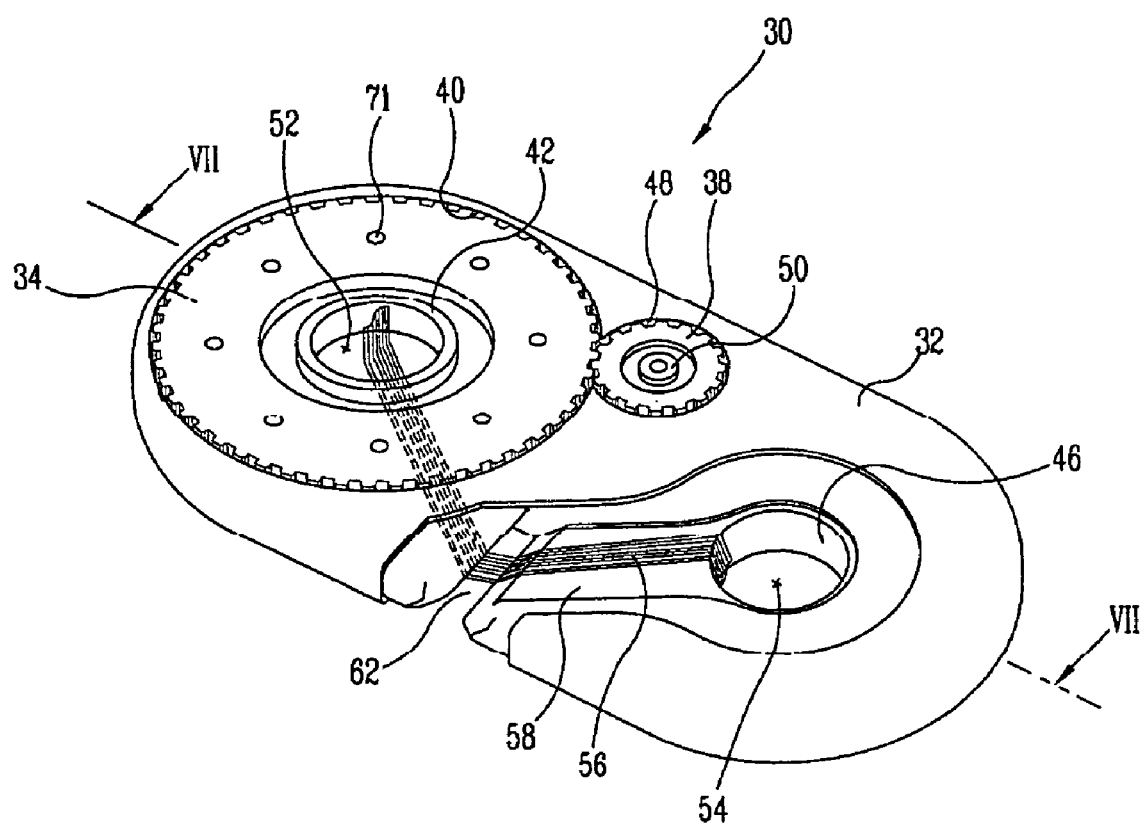
FIG. 4 is a coupled perspective view of the slide unit in accordance with one embodiment of the present invention.
Figure 5:
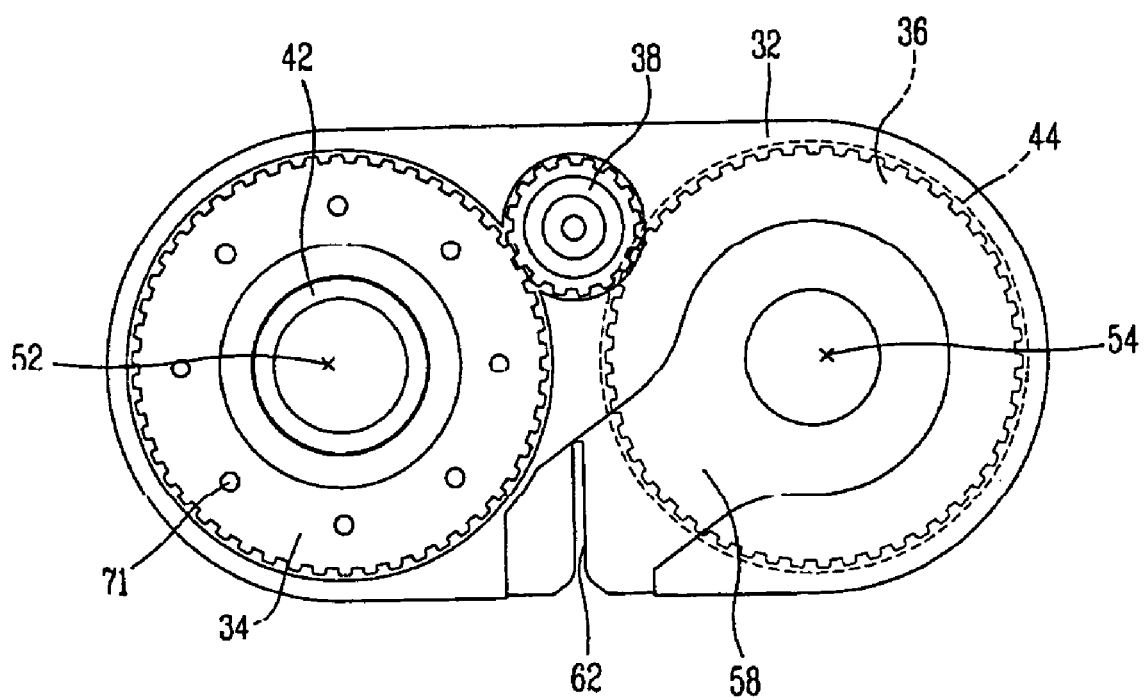
FIG. 5 is a top view of the slide unit in accordance with one embodiment of the present invention.

Referring to FIGS. 3 and 4, said preferred embodiment may further comprise a slide unit 30 installed between the first body 10 and the second body 20 for moving the first body 10 in a longitudinal direction relative to the second body 20, when any side of the first body 10 is pushed. The slide unit 30 includes a case 32, a first gear 34 rotatably mounted on the case 32, a second gear 36 rotatably mounted on the case 32, and a third gear 38 rotatably mounted on the case 32 and positioned between the first and second gears 34 and 36. A first receiving recess 40 for receiving the first gear 10 is formed on the front surface of the case 32, and a first bush 42 on which the first gear 10 is rotatably mounted is installed at the center of the first receiving recess 40.

Referring to FIG. 4, 5, 6 and 7, a second recess 44 for receiving the second gear 36 is formed on the rear surface of the case 32, and a second bush 46 on which the second gear 36 is rotatably mounted is formed at the center of the second receiving recess 44. A third receiving recess 48 for receiving the third gear 38 is formed on the case 32, for example.

In a preferred embodiment, a third bush 50 on which the third gear 38 is rotatably mounted is formed at the center of the third receiving recess 48. The first, second and third recesses 40, 44 and 48 are preferably interconnected so as to allow first and second gears 34 and 36 engage third gear 38 to mutually transfer the rotation of one gear to the others as provided in more detail below.

First and second through holes 52 and 54 are formed in the first bush 42 and the second bush 46, respectively, and a cable 56 for electrically connecting the first and second bodies 10 and 20 passes through the first and second through holes 52 and 54 (see FIG. 4). A first cable passage 58 through which the cable 56 passes is formed on a front surface of the case 32, and a second cable passage 60 through which the cable 56 passes is formed at the rear surface of the case 32 (see FIG. 6). A connection passage 62 connecting the first and second cable passages 58 and 60 is formed, extending through the case 32.

The cable 56 is connected to the first body 10, passes through the first through hole 52 formed in the first bush 42. Cable 56 then passes through the connection passage 62 by way of the second cable passages 60 formed at the rear surface of the case 32; and thereafter passes through the second through hole 54 formed in the second bush 46 by way of the first cable passage 58 formed at the front surface of the case 32. Cable 56 is then connected to the second body 20.

As shown in FIG. 3, a protecting cover 64 for preventing the cable 56 from outside exposure is mounted over the case 32. The cover 64 comprises a first cover portion 66 for covering the front surface of the case 32, the second through hole 54, and the first cable passage 58. A second cover portion 68 is integrally connected to the first cover portion 66 and bent at a right angle to cover the connection passage 62. A third cover portion 70 extends parallel to the first cover portion 66 and covers the rear surface of the case 32, the first through hole 52, and the second cable passage 60. In one embodiment, the first and third cover portions 66 and 70 have certain biasing force by way of their connection to the second cover portion 68, so that when the cover 64 is placed over the side of the case 32, cover 64 clamps around the case 32.

Figure 6:
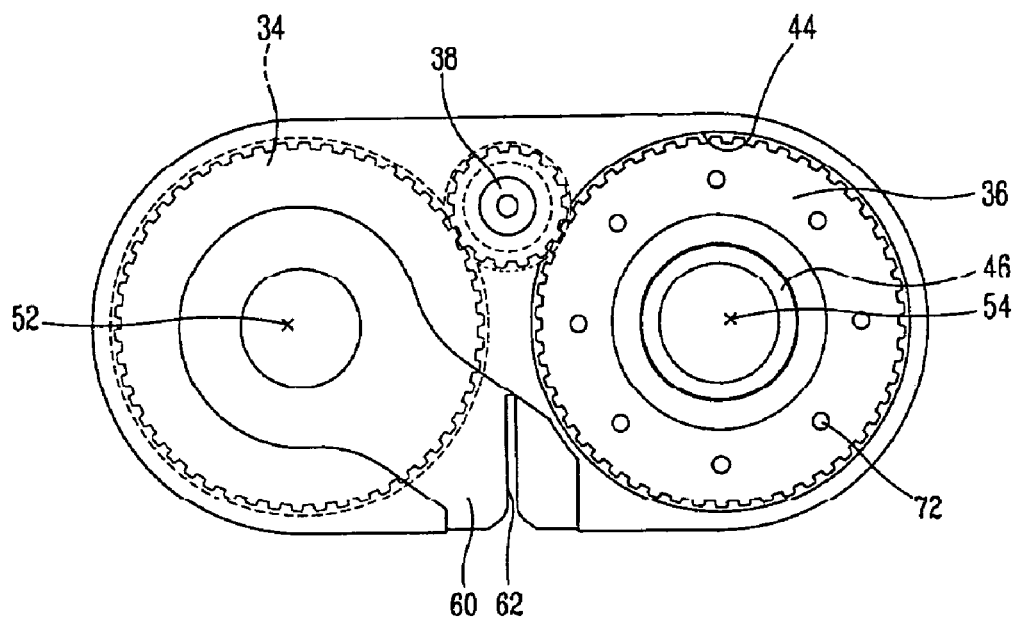
FIG. 6 is a rear view of the slide unit of FIG. 5.
Figure 7:
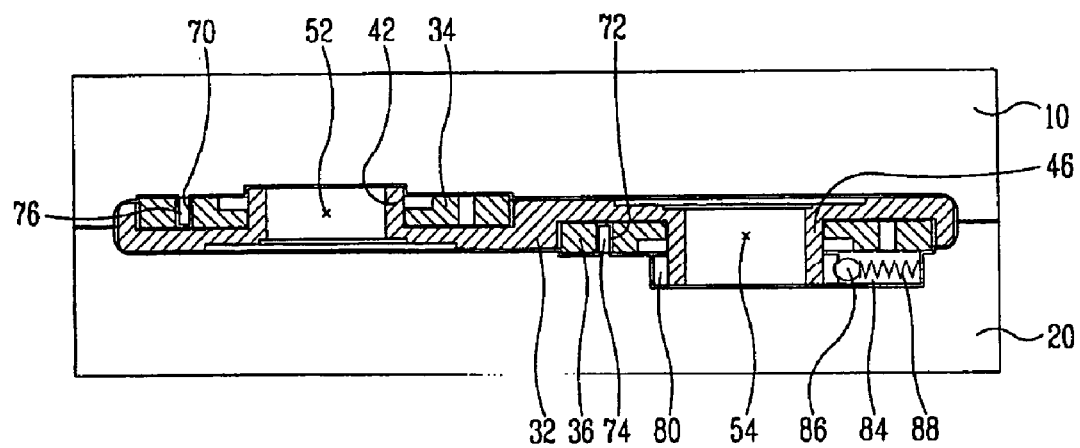
FIG. 7 is a cross sectional view taken along line VII-VII of FIG. 4.

Referring to FIGS. 3, 6 and 7, the first gear 34 is rotatably mounted on the first bush 42 and engages the third gear 38. A plurality of engagement holes 71 are engaged to the first body 10 and are preferably formed at equal intervals in a circular direction on the front surface of the first gear 34. The second gear 36 is rotatably mounted over the second bush 46 and engages the third gear 38 byway of an interconnecting opening formed between recesses 44 and 48. Engagement holes 72 are engaged to the second body 20 and are formed at equal intervals in a circular direction on the front surface of the second gear 36.

Figure 8:
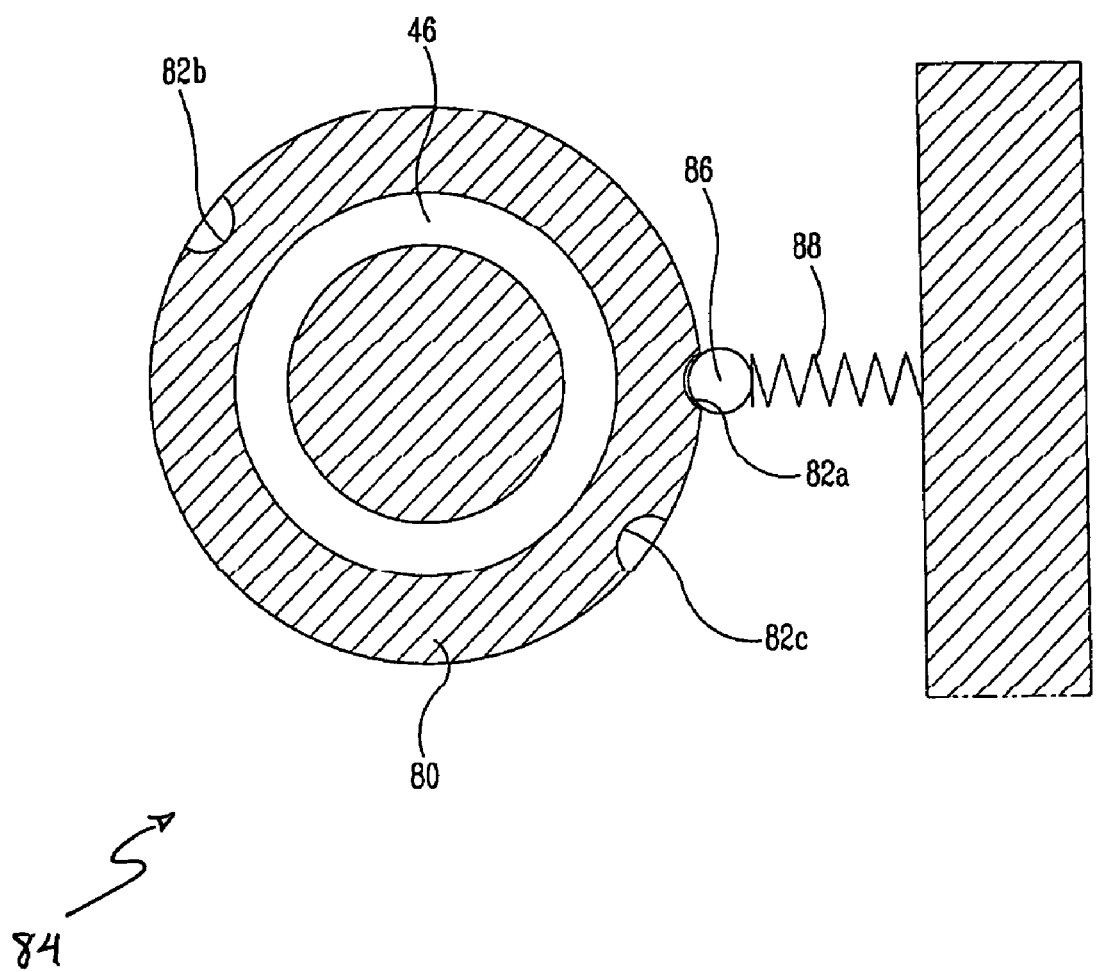
FIG. 8 is a sectional view of a position maintaining unit in accordance with one embodiment of the present invention.

A position maintaining unit 84 is installed on the slide unit 30 to allow the first and second bodies 10 and 20 to be maintained in a closed or opened state. As shown in FIGS. 7 and 8, the position maintaining unit 84 includes a fixed ring 80 positioned at an outer circumferential surface of the second bush 46 to rotate together with the second bush 46. A plurality of grooves 82a, 82b and 82c are formed in a semi-circular arrangement at an outer circumferential surface of the fixed ring 80. A ball 86 is positioned in a mounting recess formed in the second body and selectively inserted in one of the grooves 82a, 82b and 82c. A spring 88 provides certain elastic force to the ball 86.

The grooves 82a, 82b and 82c are preferably formed in the outer circumferential surface of the fixed ring 80. When the first body 10 is in a closed state, the ball 86 is inserted in the first groove 82a, so that the first groove 82a can maintain the closed state of the first body 10. When the first body 10 opens in a longitudinal direction over the second body 20, the ball 86 is inserted in the second groove 82b, so that the second groove 82b can maintain the opened state of the first body 10 in the longitudinal direction of the second body 20.

In one embodiment, when the first body 10 is in an opened state in a latitudinal direction (i.e., sliding sideways) relative to the second body 20, the ball 86 is inserted in the third groove 82c, so that the third groove 82c can maintain the opened state of the first body 10 in the latitudinal direction relative to the second body 20. In a preferred embodiment, the position maintaining unit 84 is installed between the outer circumferential surface of the first bush 42 and the first body 10.

Alternatively, the position maintaining unit 84 can be installed between the first bush 42 and the first body 10 and between the second bush 46 and the second body 20, for example.

Figure 9:
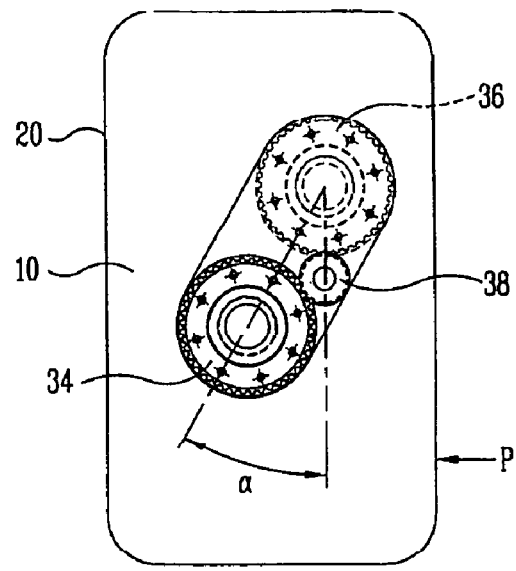
FIG. 9 is a top view showing the slide unit mounted in a closed position in accordance with the present invention.

Referring to FIG. 9, when the first body 10 is in the closed state, the first gear 34 is diagonally mounted with respect to the second gear 36 over the length of the second body 20. The sliding unit is constructed such that the first and second gears 34 and 36 are disposed such that a straight line connecting the center of the first gear 34 and the center of the second gear 36 forms an angle α with respect to a straight line in the longitudinal direction of the second body 20. Preferably, the angle α is approximately between 30~45 degrees.

Figure 11:
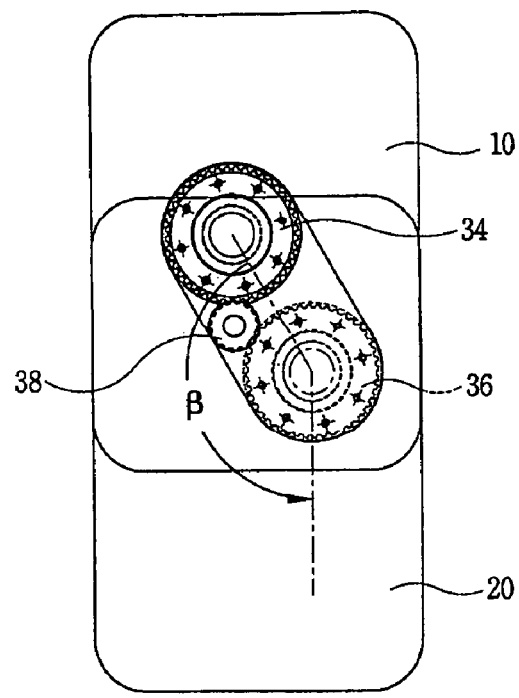

Referring to FIG. 11, when the first body 10 is slidably moved to be opened in the longitudinal direction relative to the second body 20, the straight line connecting the center of the first gear 34 and the center of the second gear 36 forms an angle β with respect to the longitudinal axis of the second body 20. Preferably, the angle β is approximately between 135~150 degrees.

Figure 12:
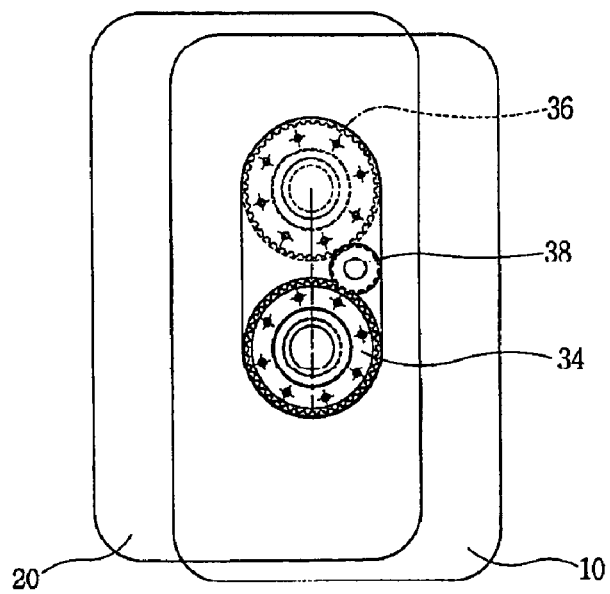

Referring to FIG. 12, when the first body 10 is in an open state in the latitudinal direction with respect to the second body 20, a straight line connecting the center of the first gear 34 and the center of the second gear 36, and the longitudinal axis of the second body 20 form an angle φ. Preferably, the angle φ is approximately between 30~45 degrees.

Figure 10:
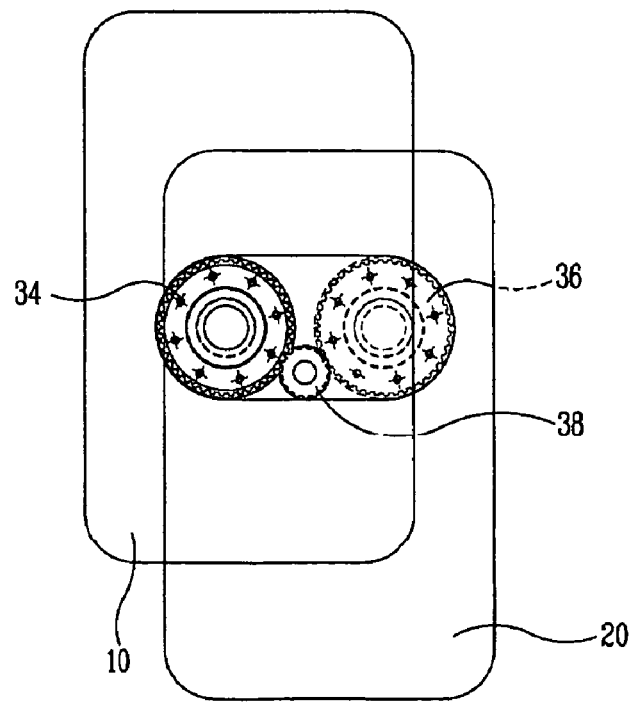
FIGS. 10-13 show various operational positions of the slide unit in accordance with the present invention.

When the mobile terminal is in a closed state, as shown in FIG. 9, the slide unit 30 is disposed diagonally by the angle α over the second body 20. In this case, the ball 86 is inserted in the first groove 82a, so that the terminal can be maintained in the closed state. When the user pushes the right side of the first body 10, for example as indicated by an arrow 'P', in order to use the mobile terminal, the first and second gears 34 and 36 are rotated in cooperation with each other by way of the third gear 38. As a result, as shown in FIGS. 10 and 11, the first body 10 is moved longitudinally relative to the second body 20.

When the first body 10 is completely opened in the longitudinal direction relative to the second body 20, the ball 86 is inserted in the second groove 82b of the fixed ring 80, allowing the first body 10 to be maintained in the opened state in the longitudinal direction relative to the second body 20. In order to close the mobile terminal, the left side of the first body 10 or the top of the first body 10 can be pushed, so that the first body 10 can be closed over the second body 20.

Figure 13:
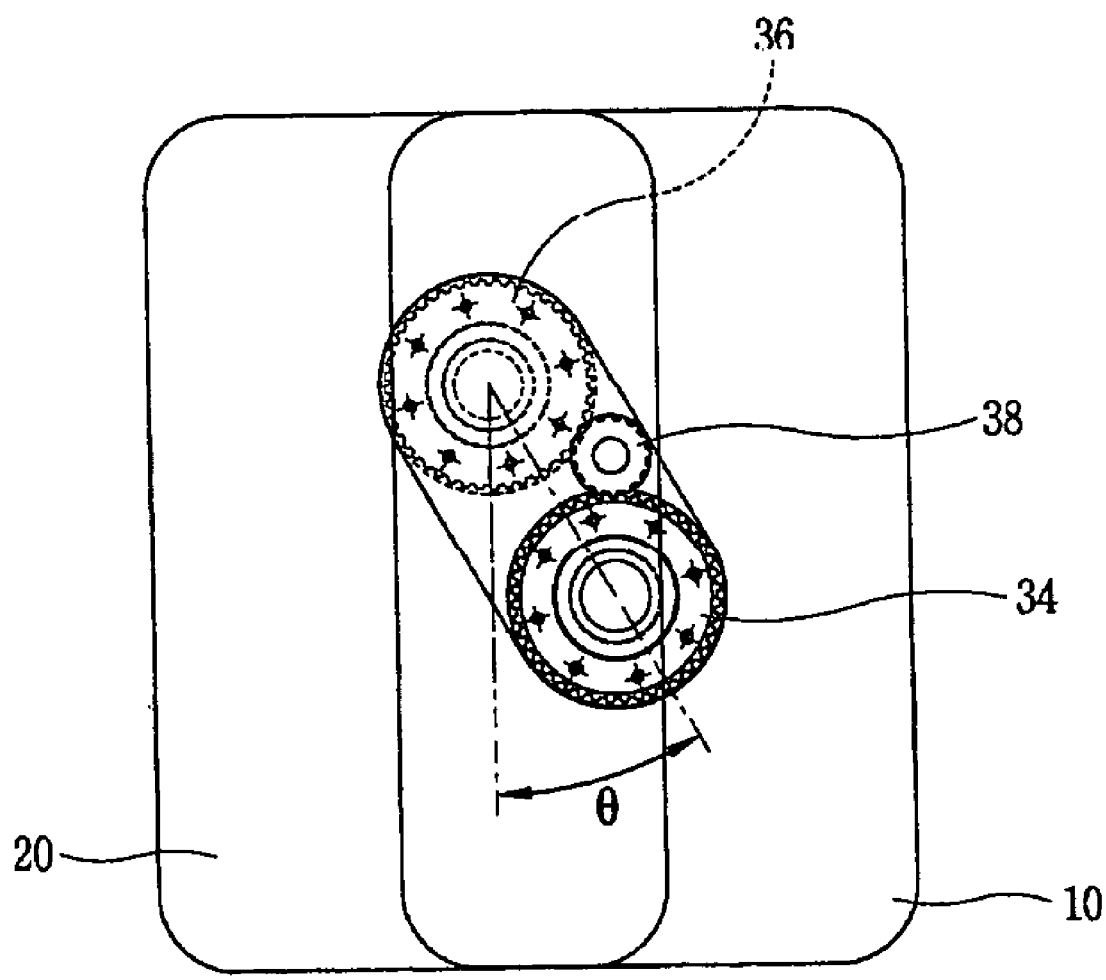

In order to open the first body 10 in the latitudinal direction of the second body 20, as shown in FIGS. 12-13, the user can push the left side of the first body 10 as shown by arrow Q. Then, the first and second gears 34 and 36 of the slide unit 30 are rotated in cooperation with each other by way of the third gear 38, allowing the first body 10 to be moved rightwardly relative to the second body 20. In this state, the ball 86 is inserted in the third groove 82c so that the first body 10 can be maintained in the opened state in the latitudinal direction relative to the second body 20.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications and variations will be apparent to those skilled in the art. In the claims, means-plus-function clauses are intended to cover the structure described herein as performing the recited function and not only structural equivalents but also equivalent structures.

What is claimed is:

1. A hand-held mobile terminal for use in a mobile communications network, the mobile terminal comprising:
    a first body comprising a top portion and a bottom portion, the top portion of the first body comprising a display panel;
    a second body comprising a top portion and a bottom portion, the top portion of the second body comprising a user interface for allowing a user to interact with the mobile terminal to input data; and
    a slide mechanism disposed in a cavity, formed between the second body's top portion and the first body's bottom portion, for coupling the first and second bodies and for allowing the first body to slide relative to the second body in both longitudinal and latitudinal directions,
    wherein in a closed position, the first body covers the top portion of the second body to prevent access to the user interface,
    wherein in an open position, the first body slides relative to the top portion of the second body, by way of the slide mechanism in at least one of the longitudinal and latitudinal directions, to expose the user interface,
    wherein in both the open and closed positions the longitudinal axis of the first body is parallel to the longitudinal axis of the second body, and
    wherein the slide mechanism comprises:
        a case;
        a first gear rotatably mounted on a first side of the case and coupled to the first body;
        a second gear rotatably mounted on the second side of the case and coupled to the second body; and
        a third gear engaged to the first and second gears to transfer rotational movement between the first gear and the second gear.

2. The mobile terminal of claim 1, wherein the slide mechanism is diagonally positioned, between the first body and the second body, in relationship to the longitudinal axes of the first body and the second body,
    wherein the diagonal positioning is defined by an angle formed between imaginary first and second axes, wherein the first axis passes through center of the first and second gears, and the second axis passes through the center of the second and third gears.

3. The mobile terminal of claim 2, wherein the angle is approximately between 30 and 40 degrees when the mobile terminal is in the closed position.

4. The mobile terminal of claim 2, wherein the angle is approximately between 135 and 150 degrees when the mobile terminal is in a longitudinal open position.

5. The mobile terminal of claim 1, wherein the case comprises:
    a first bush on which the first gear is rotatably mounted;
    a second bush on which the second gear is rotatably mounted; and
    a third bush on which the third gear is rotatably mounted, wherein the third bush is positioned between the first bush and the second bush.

6. The mobile terminal of claim 5, wherein a first opening is defined in the first bush and a second opening is defined in the second bush, the mobile terminal further comprising:
    a cable for electrically connecting the first body to the second body, wherein the cable passes through the first and second openings.

7. The mobile terminal of claim 6, wherein a cable passage connects the first and second openings, the cable passage providing a thorough way for the cable to pass from the first side of the case to the second side of the case.

8. The mobile terminal of claim 7, wherein the sliding module further comprises a cover for covering the first and second sides of the case to protect the cable.

9. The mobile terminal of claim 5, wherein the slide mechanism further comprises a position maintaining unit for maintaining a slide position of the first body relative to the second body in multiple lock states.

10. The mobile terminal of claim 9, wherein the position maintaining unit comprises:
   a fixed ring in operational relationship with the first and second bushes, wherein a plurality of grooves are defined at an outer circumferential surface of the fixed ring;
   a ball for engaging at least one of said plurality of grooves, wherein each groove is associated with a lock position for maintaining the slide position of the first body relative to the second body; and
   a biasing member for applying pressure on the ball so that the ball engages a first groove from among said plurality of grooves, when the first body slides relative to the second body in a first lock position.

11. The mobile terminal of claim 9, wherein the multiple lock states translate to closed, open longitudinal and open latitudinal slide positions for the first body relative to the second body.

12. The mobile terminal of claim 1 wherein the first body has a right side and a left side and the mobile terminal can be switched from a closed position to an open longitudinal position by pushing on the right side of the first body.

13. The mobile terminal of claim 1 wherein the first body has a right side and a left side and the mobile terminal can be switched from a closed position to an open latitudinal position by pushing on the left side of the first body.

14. A hand-held mobile terminal for use in a mobile communications network, the mobile terminal comprising:
   a first body comprising a top portion having a display panel, and a bottom portion;
   a second body comprising a top portion and a bottom portion, the top portion of the
   second body having a user interface for allowing a user to interact with the mobile terminal to input data; and
   a slide mechanism disposed in a cavity, formed between the second body's top portion and the first body's bottom portion, for coupling the first and second bodies with each other and allowing the first body to slide relative to the second body in both longitudinal and latitudinal directions,
   wherein in a closed position, the first body covers at least a part of the top portion of the second body to prevent access to the user interface,
   wherein in an open position, the first body slides relative to the top portion of the second body, by way of the slide mechanism in both the longitudinal and latitudinal directions, to expose the user interface,
   wherein in both the open and closed positions, a longitudinal axis of the first body is parallel to a longitudinal axis of the second body,
   wherein the slide mechanism comprises:
      a first member coupled to the first body;
      a second member coupled to the second body; and
      a third member connecting the first and second members to each other and rotatably engaged with either the first member or the second member, and
   wherein when the first body slides from the closed position to the open position, the first member rotates about the second member.

15. The mobile terminal of claim 14, wherein the slide mechanism is diagonally positioned, between the first body and the second body, in relationship to the longitudinal axes of the first body and the second body,
   wherein the diagonal positioning is defined by an angle formed between imaginary first and second axes, wherein the first axis passes through center of a first and a second gears, and the second axis passes through the center of the second and third gears.

16. The mobile terminal of claim 15, wherein the angle is approximately between 30 and 40 degrees when the mobile terminal is in the closed position.

17. The mobile terminal of claim 15, wherein the angle is approximately between 135 and 150 degrees when the mobile terminal is in a longitudinal open position.

18. A hand-held mobile terminal for use in a mobile communications network, the terminal comprising:
   a first body comprising a top portion and a bottom portion, the top portion of the first body comprising a display panel;
   a second body comprising a top portion and a bottom portion, the top of the second body comprising a user interface for allowing a user to interact with the mobile terminal to input data; and
   a slide mechanism disposed in a cavity, formed between the second body's top portion and the first body's bottom portion, for coupling the first and second bodies and for allowing the first body to slide relative to the second body in both longitudinal and latitudinal directions,
   wherein in a closed position, the first body covers the top portion of the second body to prevent access to the user interface,
   wherein in an open position, the first body slides relative to the top portion of the second body, by way of the slide mechanism in at least one of the longitudinal and latitudinal directions, to expose the user interface,
   wherein in both the open and closed positions the longitudinal axis of the first body is parallel to the longitudinal axis of the second body, and
   wherein a cable passage connects a first and a second openings, the cable passage providing a thorough way for a cable to pass from a first side of the case to a second side of the case.

19. The mobile terminal of claim 18, wherein the sliding module further comprises a cover for covering the first and second sides of the case to protect the cable.

20. The mobile terminal of claim 19, wherein the slide mechanism further comprises a position maintaining unit for maintaining a slide position of the first body relative to the second body in multiple lock states.

* * * * *